United States Patent [19]

Tveit

[11] Patent Number: 5,572,785
[45] Date of Patent: Nov. 12, 1996

[54] APPARATUS AND METHOD FOR AUTOMATED ASSEMBLY OF PRECISION COMPONENTS

[75] Inventor: Gary L. Tveit, Churchville, N.Y.

[73] Assignee: Eastman Kodak Company, Rochester, N.Y.

[21] Appl. No.: 281,284

[22] Filed: Jul. 27, 1994

[51] Int. Cl.⁶ .................. B23P 11/00; B23P 19/04
[52] U.S. Cl. .................. 29/468; 29/283; 294/64.1; 901/40
[58] Field of Search .................. 29/464, 468, 701, 29/743, 283, 281.1; 294/64.1; 901/40; 269/21

[56] References Cited

U.S. PATENT DOCUMENTS

| | | | |
|---|---|---|---|
| 2,094,043 | 9/1937 | Marshall | 29/84 |
| 2,976,037 | 3/1961 | Seel et al. | 271/26 |
| 3,025,590 | 3/1962 | Litz | 29/148.4 |
| 3,134,208 | 5/1964 | Richmond | 51/235 |
| 3,460,822 | 8/1969 | Link | 269/21 |
| 3,672,063 | 6/1972 | Hopkins et al. | 33/180 L |
| 4,530,635 | 7/1985 | Engelbrecht et al. | 414/627 |
| 4,763,941 | 8/1988 | Sniderman | 294/64.1 |
| 4,822,091 | 4/1989 | Vermeer et al. | 29/743 X |
| 5,207,465 | 5/1993 | Rich | 29/743 X |

FOREIGN PATENT DOCUMENTS

| | | | |
|---|---|---|---|
| 241391 | 12/1986 | Germany | 294/64.1 |
| 3-243099 | 10/1991 | Japan | 29/743 |
| 1038221 | 3/1983 | U.S.S.R. | 901/40 |
| 1360983 | 12/1987 | U.S.S.R. | 901/40 |
| 1407802 | 7/1988 | U.S.S.R. | 901/40 |

Primary Examiner—S. Thomas Hughes
Attorney, Agent, or Firm—Charles E. Snee, III

[57] ABSTRACT

Apparatus and method for automatically interfitting a part and mount utilize a housing having a chamber and an inwardly tapered alignment surface. A piston reciprocates in the chamber and has a gripper end that moves out of and into the housing, past the alignment surface, when alternating spring and air pressure forces act on the piston. Such movement of the piston accurately positions a gripped part, and the housing then reciprocates so that the alignment surfaces accurately position a mount. The piston then moves the part to an interfit with the mount.

16 Claims, 2 Drawing Sheets

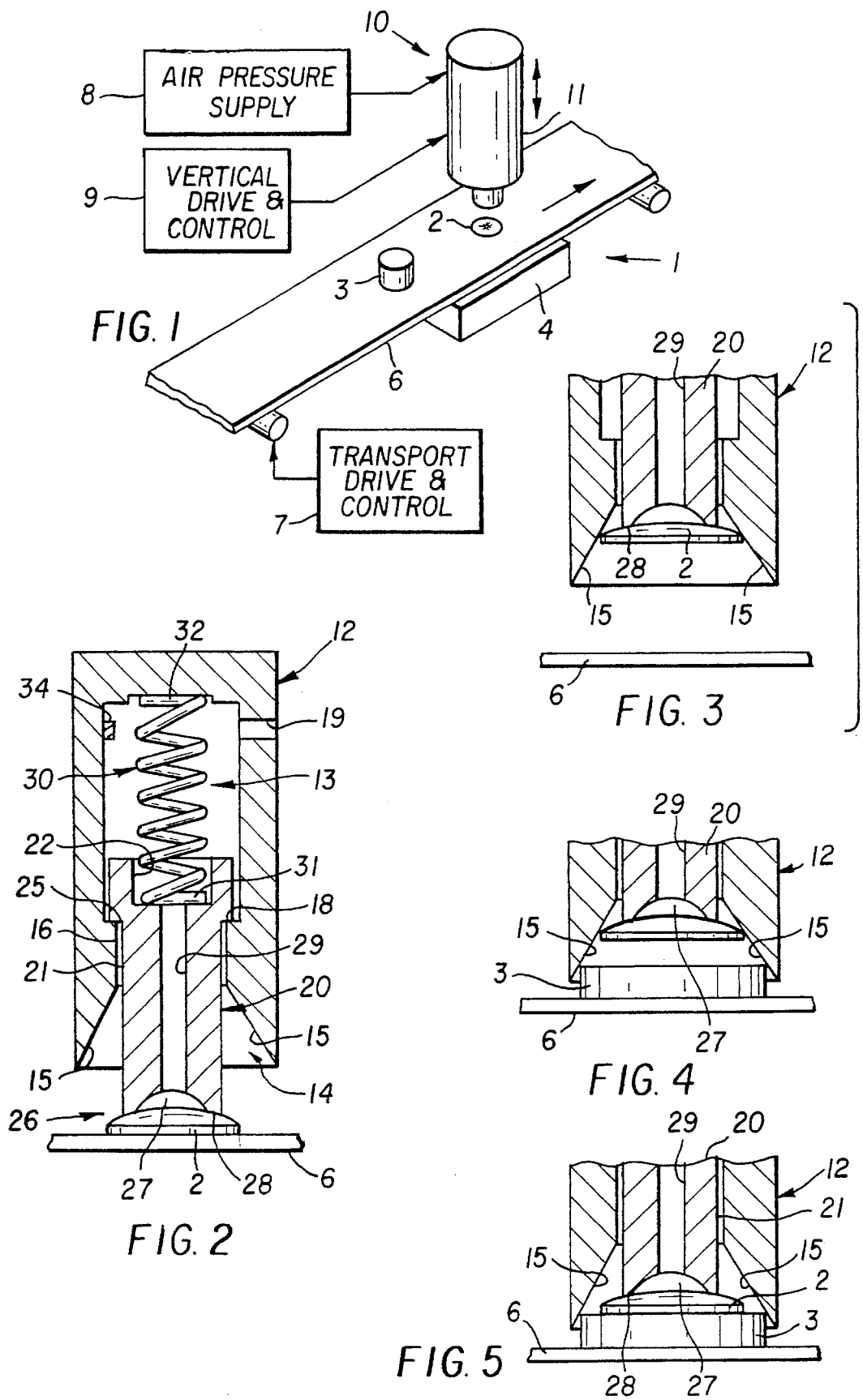

APPARATUS AND METHOD FOR AUTOMATED ASSEMBLY OF PRECISION COMPONENTS

FIELD OF THE INVENTION

The present invention relates to the assembly of precision components, such as lens elements and their barrel mountings, and more particularly to methods and apparatus for interfitting such high precision components accurately, in an automated fashion.

BACKGROUND OF INVENTION

Manufacturing competitiveness is increasingly dependent on the use of automatons in the construction of products; and modern assembly lines employ apparatus, often referred to as industrial robots, which are automated (for example, operate with a relatively high degree of self control) to perform various assembly steps of an overall product construction. Moreover, the current designs for such automated assembly apparatus aim towards "flexible" automation, which refers to the capability of a particular automated apparatus to be used, perhaps with some modifications, for the assembly of more than one type of product.

U.S. Pat. No. 2,094,043 provides an example of a prior art apparatus for assembling precision components of an acoustic device. This apparatus uses two jig structures that precisely position and hold respective components and a gauge element that accurately aligns the jig structures, one to the other, before the jig structures are moved to interfit and attach their supported components. These jig structures and the gauge element are themselves highly precise in dimension and expensive to fabricate. Also, they are relatively unique to the particular acoustic device disclosed. Further, the overall assembly procedure requires operator intervention to align the gauge element with one of the jig structures so that the assembly procedure is not subject to a high degree of automation. Thus, improvements are desired over the '043 patent approach to enable automated assembly of precision components, with a good degree of product "flexibility".

The assembly of optical lens elements with their cylindrical housings, commonly called "barrels", provides another good example of a procedure requiring the accurate interfitting of precision components. The traditional approach for such an assembly is to mount the lens element and lens barrel into complimentary precision fixtures. The fixtures are then moved to a precise interfit relation that correctly mounts the lens element in the barrel. As in the previous example, the lens and barrel fixtures must be accurately dimensioned and are expensive to fabricate. Again, the fixtures are relatively unique to the particular lens and barrel configurations and do not have a good degree of product "flexibility".

SUMMARY OF INVENTION

Thus, one important purpose of the present invention is to provide improved apparatus and methods for the assembly of precision components. For example, the invention can provide improvements in regard to the degrees of precision and automation afforded. Another significant advantage of the present invention is its relative simplicity, and therefore inexpensiveness. A further advantage of the present invention is the degree to which it is "flexible" as to usefulness in assembling different precision products automatically.

In one aspect the present invention constitutes apparatus for automatically assembling components such as a part and a mount that have a precision outlines. Such apparatus includes a housing that reciprocates toward and away from a work platform and has a similarly reciprocating piston that is movable within a chamber of the housing to cause a gripping end of the piston to protrude from, and withdraw within, the housing chamber's mouth. The chamber mouth has alignment surfaces that contact and precisely position a part that is gripped and withdrawn by the piston. Alignment surfaces of the mouth also precisely contact and position the mount as the housing is moved onto the mount. The chamber behind the piston can be coupled to a positive pressure source to force a gripped part into interfit with an aligned mount.

In another aspect the present invention constitutes a method for automatically assembling a part and a mount having precise peripheral features. Such method includes the steps of: (i) moving the gripper end of a piston to engage a part; (ii) withdrawing the piston into a housing chamber so that the engaged part contacts an inwardly tapered alignment surface and slides into an aligned position on the gripper end; (iii) moving the housing toward the mount so that an alignment surface cams the mount into precise alignment with the gripped part and (iv) moving the piston toward the aligned mount to complete interfit of the part and mount.

BRIEF DESCRIPTION OF DRAWINGS

The subsequent descriptions of preferred embodiments of the invention are made with reference to the accompanying drawings wherein:

FIG. 1 is a schematic perspective view of an automated assembly system incorporating one embodiment of the present invention;

FIG. 2 is a cross-sectional view showing the details of one embodiment of the present invention, at a beginning stage of its assembly operation;

FIG. 3 is a fragmentary view, similar to FIG. 2, but showing a subsequent stage of the inventions operation;

FIG. 4 is a view like FIG. 3, but showing yet another subsequent stage of invention operation;

FIG. 5 is a view like FIG. 4, but showing still another subsequent stage of the invention operation;

DETAILED DESCRIPTION OF INVENTION

Figure 6:
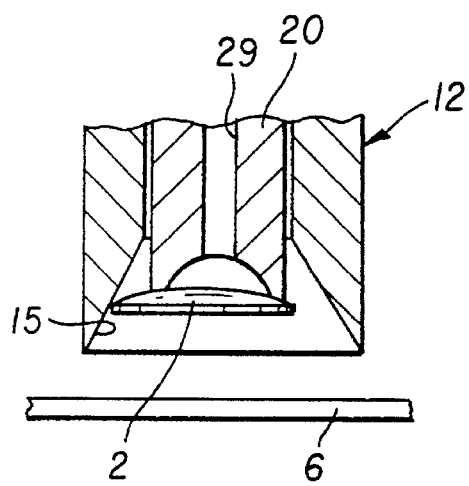
FIGS. 6 and 7 are fragmentary cross-section views illustrating non-aligned conditions of a part and mount respectively, which can occur during the FIG. 2–5 sequences.

Referring to FIG. 1, there is illustrated an automated assembly station 1 that employs one preferred embodiment of the present invention. Thus, automatic assembly system 10 is operative to interfit parts, e.g., lenses 2, into mounts, e.g., lens barrels 3. As shown schematically, the lens 2 and barrel 3 are moved in succession to a work platform 4, e.g., by a transport belt 6 and drive and control subsystem 7. Subsytem 7 can include suitable photosensor circuits and logic (not shown) to stop belt 6 when lenses 2 and barrels 3 sequentially arrive at a work position, generally aligned beneath assembly device 11 and above work platform 4. Assembly system 10 also includes a negative/positive air pressure supply subsystem 8 and a vertical drive and control subsystem 9, whose functions are coordinated with the transport drive and control subsystem 7 by an overall system control, e.g., a microcomputer, not shown. Those skilled in the art will understand that the assembly system 10 can form a part of a more comprehensive system wherein further assembly operations, utilizing the assembled packages of parts and mounts 2,3, are effected.

Referring now to FIG. 2, the assembly device 11 is shown in cross-section to comprise housing 12 which is machined or otherwise constructed to include a piston chamber 13 having an outlet opening mouth 14 comprising inwardly tapering alignment guide surfaces 15. A piston member 20 is mounted within chamber 13 and has a cylindrical side 21 wall configuration sized to slide in relatively air tight relation with the cylindrical guide surface 16. If desired, sealing rings can be mounted in the guide surface 16, which are aligned to direct the reciprocating movement of the piston toward and away from the work platform 4.

The top of piston member 20 has a recess 22 which supports and positions one end 31 of coil spring 30, (whose other end 32 presses against the top interior wall of chamber 13). The spring 30 has a resilient extension sufficient to urge the piston control edge 25 to bottom upon chamber control ledge 18. The device 11, in its initial position is moved by vertical drive and control 9 to a location relative to the transport belt 6 such that, when surfaces 18, 25 abut, gripper end 26 of piston member 20 is resting on, or proximate, the top of a lens element 2 on belt 6. This constitutes a position such as schematically shown in FIG. 2.

The gripper end 26 is constructed to have a domed central recess 27 and a peripheral rim surface 28. A central air passage 29 couples recess 28 to the recess 22 and thus to the interior of chamber 13, and to the air pressure control system 8 (via port 19 in the housing 12).

The cooperative functioning of the components of assembly device 11 will be more fully understood by the description of exemplary assembly operation sequences, which follows, referring also to FIGS. 3–7. Thus, in the stage of operation shown in FIG. 2, housing 12 has been moved by drive and control 9 to its nominal start position, and spring 30 has moved piston member 20 downward so that surfaces 18 and 25 abut and rim 28 presses lightly on, or is closely proximate, the top of lens 2.

Next, under overall system control, negative/positive air pressure supply 8 is signaled to provide a vacuum in chamber 13. The reduced chamber pressure is communicated, via passage 29, to recess 27, and lens 2 moves to seal the recess. After passage 29 is blocked by lens 2, the piston 20 moves upwardly, against the force of spring 30, so that gripper end 26 withdraws into opening 14 and the gripped lens 2 is precisely centered by alignment surfaces 15. For example, as is illustrated in FIG. 6, an edge of an off-center lens 2 will contact inwardly tapering surface 15 and be slid to the centered position shown in FIG. 3, as the piston moves to its top position. A stop 34 can be provided on the inner wall of chamber 13 to limit the upward movement of piston 20 at a position such as shown in FIG. 3. The vacuum level is selected in coordination with the spring constant of spring 30 so that lens 2 is held to rim 28 (in a laterally slidable condition) when piston member 20 is withdrawn in its top position.

Figure 7:
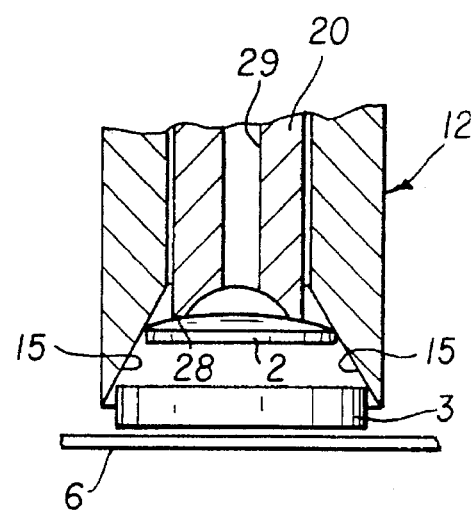

Next under overall system control, the transport drive and control subsystem 7 positions a lens barrel 3 at platform 4, generally centered with respect to the alignment surfaces 15 of housing mouth 14. The vertical drive and control subsystem 9 moves the housing 12 downwardly over the generally positioned lens barrel 3 so that surfaces 15 contact and cam barrel 3 to a precisely centered position, as shown in FIG. 4. FIG. 7 shows an exemplary intermediate stage where a surface 15 contacts the peripheral edge of barrel 3 and begins to cam the barrel to slide on belt 6 to a precise assembly position (e.g. centered) visa vis lens 2. The centered condition can be sensed, e.g., by an increase in resistance to the downward movement of housing 12, and the vertical drive is terminated. With the assembly device 11 now in the stage of operation shown in FIG. 4, the negative/positive air supply 8 is actuated to terminate the vacuum supplied to chamber 13 and thus allow spring 30 to move the precisely positioned lens 2 (still gripped by sufficient vacuum to maintain its centered condition) into engagement with precisely positioned barrel (still held in centered condition by alignment surfaces 15). To provide additional pressure to force lens 2 into interfit with barrel 3, supply subsystem 8 is actuated to provide a positive pressure (e.g., 4 psi) into the chamber via port 19, thus further urging piston 20 and lens 2 downwardly. With the assembly completed as shown in FIG. 5, the vertical drive is activated to move housing 12 upwardly and transport belt 6 is operated by drive and control 7 to move the assembled unit 2, 3 downstream, and to position the lens 2 of the next component pair for assembly.

It will be appreciated that other work station arrangements can be utilized. In one preferred alternative, a carton of nested lenses is positioned at a work station adjacent a carton of nested barrels. A robotic system, not shown, x-y positions the assembly device 11, visa vis the cartons, and other controls operate as described above to perform the assembly.

It will be appreciated that various other part and part-mounts can be assembled utilizing the present invention. For example, with appropriate modification of alignment surfaces 15, elements with congruent outlines, or corresponding outlines other than circular, can be guided to precise relative positions for assembly. With other modifications, parts and mounts with different precise outline features can be positioned in accurate relative positions by correspondingly different alignment surfaces, for subsequent engagement.

Figure 8:
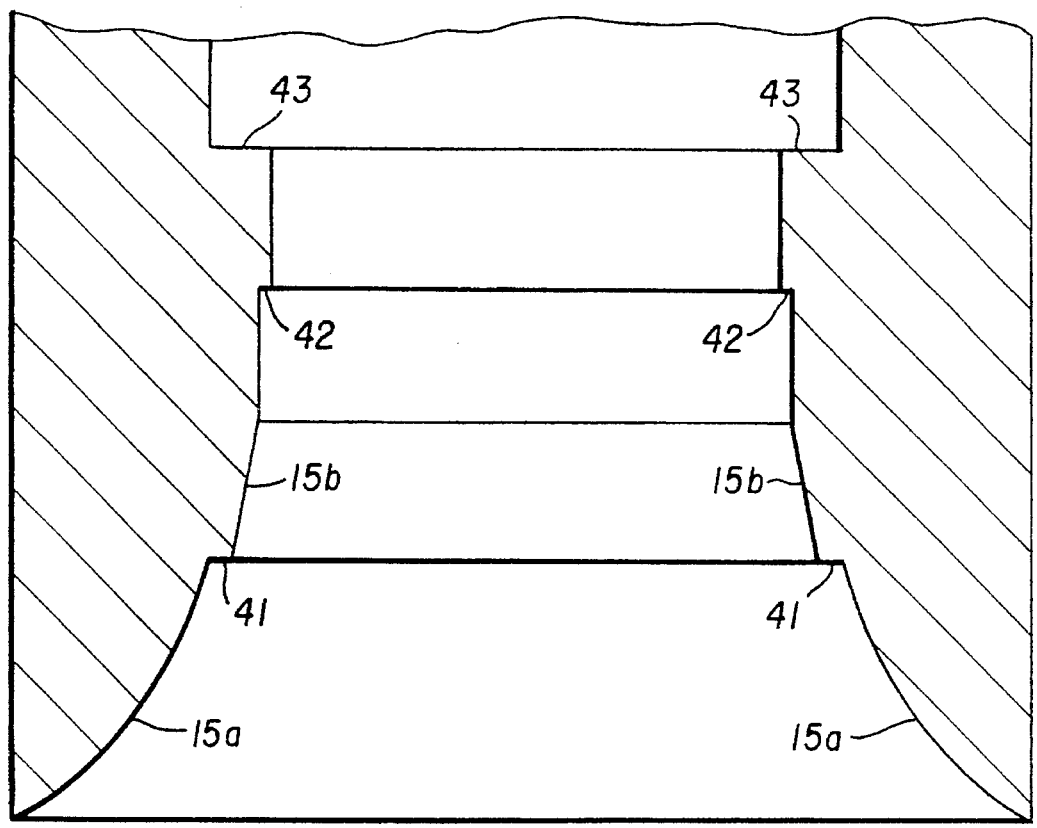
FIG. 8 is an enlarged cross-section showing the details of another preferred chamber and alignment mouth construction for practice of the present invention.

FIG. 8 illustrates another portion preferred chamber and guide surface configuration for mounting circular elements such as lenses and lens barrels. In this embodiment surfaces 15*a* are uniquely designed to center a lens barrel and surfaces 15*b* are designed to center a lens. Also, ledge 41 provides a stop to rest on the top of the barrel mount, ledge 42 provides a stop for upward movement of the piston member and ledge 43 provides a stop for downward movement of the piston.

The invention has been described with particular reference to preferred embodiment thereof, but it will be understood that variations and modifications can be effected within the spirit and scope of the invention.

I claim:

1. Apparatus for automatically assembling precision parts and mounts delivered to a work platform said apparatus comprising:

(a) housing means mounted to reciprocate generally normally to such work platform and including:
      (i) a piston chamber aligned generally normally to such platform,
      (ii) a chamber mouth located proximate such platform and having alignment surfaces, and;
      (iii) a fluid port coupled to an interior region of said chamber;

(b) piston means mounted for reciprocation in said piston chamber and having means for part gripping located on one end thereof, to protrude from, and withdraw within, said chamber mouth; and (c) control means for:
(1) activating said piston means to protrude from said chamber mouth and grip a part on such platform and to withdraw within said chamber so that said alignment surfaces of said chamber mouth cam such gripped part to a precise position;
(2) moving said housing means toward a mount on such platform so that said chamber mouth alignment surfaces cam such mount into a precise location vis a vis such gripped part and
(3) moving said piston to urge such aligned and gripped part into interfit with such aligned mount.

2. Apparatus for automatically assembling a part, located on a support surface and having a predetermined precision outline, into a mounting of congruent precision outline, said apparatus comprising:

(a) housing means mounted for reciprocation in first and second directions generally normal to such support surface and including an internal chamber with an outlet opening having a guide surface that tapers inwardly so that successive cross-sections, normal to said reciprocating directions, are congruent to said part and mounting outlines;
(b) piston means, including a part gripping end, for reciprocating in said first and second directions within said chamber so that a said part gripping end moves:
(i) beyond said opening for gripping a part on such support surface, and;
(ii) within said opening for centering such gripped part by contact with said guide surface;
(c) means for moving said housing means, with such gripped part, so that said guide surface contacts and aligns a mounting on such support surface visa vis such gripped and centered part; and
(d) means for moving said piston toward such centered mounting to interfit such gripped part therewith.

3. The invention defined in claim 2 wherein said piston means includes a gas passage from said gripping end to its opposite end and said apparatus comprises means for forming a vacuum within said chamber.

4. The invention defined in claim 3 wherein said apparatus comprises spring means for urging said piston out of said chamber.

5. The invention defined in claim 4 wherein said vacuum forming means overbalances said spring means when a part blocks said passage, whereby said part gripping end is withdrawn into said opening.

6. The invention defined in claim 5 wherein said guide surface forces the part, vacuum-held by said gripping end, to slide to a precisely centered position during withdrawal of said gripping end.

7. Apparatus for automatically mounting circular cross-section lenses into circular cross-section lens barrels with high dimensional precision, said apparatus comprising:

(a) a housing member having a piston chamber which opens at one end to form an inwardly tapered, generally conical alignment surface;
(b) a piston member mounted for fluidly sealed, reciprocatory movement within said piston chamber such that a gripping end thereof moves out of and into said open end of said piston chamber, said piston member having a fluid passage from said gripping end through said piston member to its opposite end and the interior of said piston chamber housing;

(c) spring means for urging said piston out of said chamber and withdrawing said gripping end into said piston chamber;
(d) mean for mounting said housing for reciprocating movement generally in the same directions as said piston movement; and
(e) means for selectively creating a negative or positive pressure in said piston chamber to cause movement of said gripping end into and out of said open end.

8. The invention defined in claim 7 wherein said alignment surface is shaped to cam the edges of a lens that is vacuum-held on said gripper end and moved into said open end, into a precise alignment to said surface.

9. The invention defined in claim 8 wherein said alignment surface is shaped to cam the edges of a lens barrel onto which it is moved, into a precise alignment to said surface.

10. An apparatus for automatically assembling a precision component to a mount, comprising:

(a) a housing including a piston chamber having a mouth comprising an inwardly tapered guide surface;
(b) a piston member mounted for reciprocating movement within said piston chamber, said piston member having an axial channel extending therethrough in continuous fluid communication with said piston chamber, said piston member including a gripping end adjoining said channel, said gripping end defining a recess adapted to receive the precision component;
(c) means for providing a negative pressure in said piston chamber such that said gripping end forms a vacuum seal with the precision component; and
(d) a spring member biasing said gripping end to extend from said piston chamber, said spring member being compressible by said negative pressure.

11. The apparatus according to claim 10 wherein said spring member is compressed to withdraw said gripping end and the precision component into said piston chamber.

12. The apparatus according to claim 10 wherein said inwardly tapered guide surface centers the precision component on said piston member.

13. The apparatus according to claim 10 wherein said recess is complementary to the precision component in order to form said vacuum seal.

14. The apparatus according to claim 10 wherein said housing has a longitudinal axis, and said housing is adapted for reciprocating movement in a direction substantially along said longitudinal axis.

15. A method for automatically assembling a precision component to a mount, comprising:

biasing a gripping end of a piston member toward the precision component;

vacuum sealing the gripping end and the precision component;

overcoming said biasing during said vacuum sealing;

centering the precision component on said piston member;

delivering the precision component to the mount;

releasing the vacuum seal; and assembling the precision component to the mount.

16. The method according to claim 15 wherein said biasing is overcome only if said vacuum seal forms between said gripping end and the precision component.

* * * * *